United States Patent
Reddy et al.

(10) Patent No.: US 9,435,997 B2
(45) Date of Patent: Sep. 6, 2016

(54) MULTIDIMENSIONAL ROTARY MOTION APPARATUS MOVING A REFLECTIVE SURFACE AND METHOD OF OPERATING SAME

(71) Applicant: PENTAIR WATER POOL AND SPA, INC., Sanford, NC (US)

(72) Inventors: Rakesh Reddy, Deerfield Beach, FL (US); Bruce Johnson, Deerfield Beach, FL (US); Kevin Doyle, Deerfield Beach, FL (US); Gabriel Perez, Deerfield Beach, FL (US)

(73) Assignee: Pentair Water Pool and Spa, Inc., Cary, NC (US)

( * ) Notice: Subject to any disclaimer, the term of this patent is extended or adjusted under 35 U.S.C. 154(b) by 184 days.

(21) Appl. No.: 13/957,418

(22) Filed: Aug. 1, 2013

(65) Prior Publication Data

US 2014/0160548 A1    Jun. 12, 2014

Related U.S. Application Data

(63) Continuation-in-part of application No. 13/626,871, filed on Sep. 25, 2012.

(60) Provisional application No. 61/678,622, filed on Aug. 1, 2012.

(51) Int. Cl.
G02B 26/08    (2006.01)

(52) U.S. Cl.
CPC .................. *G02B 26/0816* (2013.01)

(58) Field of Classification Search
CPC .. G02B 26/08; G02B 26/0816; G02B 26/10; G02B 26/124; H04N 1/193
USPC ....................................... 359/202.1
See application file for complete search history.

(56) References Cited

U.S. PATENT DOCUMENTS

| | | |
|---|---|---|
| 1,982,639 A | 12/1934 | Christofferson |
| 2,016,991 A | 10/1935 | Dollinger |

(Continued)

FOREIGN PATENT DOCUMENTS

| | | |
|---|---|---|
| AU | 2007216901 B2 | 7/2008 |
| CN | 201180381 | 1/2009 |

(Continued)

OTHER PUBLICATIONS

"OptimAir Filtration System", product brochure [online]. Optimum Clean Air, LLC, 2012 [retrieved on May 15, 2012]. Retrieved from the Internet: <http://www.optimair.com/ >, 1 page.

(Continued)

*Primary Examiner* — Jennifer L. Doak
(74) *Attorney, Agent, or Firm* — Quarles & Brady LLP

(57) ABSTRACT

A rotary motion controller controlling the motion of a mirror in a projection system is described having a mounting element coupled to a support member. A two-axis coupling is provided with at least two input shafts coupled to two drive mechanisms. A channeled portion is provided in a second of the two input shafts through which the support member extends there through and is guided thereby and where the at least one support member is coupled to the first input shafts via an input coupling coupled to and driving the support member and a control input controlling the position of the at least two input shafts. A method of controlling a mirror in an underwater projection system is also provided along with a method of operating a controller for an underwater projection system and a further embodiment for providing movement of a mirror in an underwater projector.

19 Claims, 15 Drawing Sheets

(56) References Cited

U.S. PATENT DOCUMENTS

| | | |
|---|---|---|
| 2,500,123 A | 3/1950 | Gwaltney et al. |
| 2,808,899 A | 10/1957 | Hofstetter |
| 3,262,321 A | 7/1966 | Moul |
| 3,276,191 A | 10/1966 | Revell |
| 3,321,345 A | 5/1967 | Duncan et al. |
| 3,337,285 A | 8/1967 | Travis |
| 3,337,898 A | 8/1967 | Schmid et al. |
| 3,408,795 A | 11/1968 | Revell et al. |
| 3,596,442 A | 8/1971 | Neumann |
| 3,695,008 A | 10/1972 | Neumann |
| 3,774,373 A | 11/1973 | Welch et al. |
| 3,985,528 A | 10/1976 | Revell |
| 4,054,521 A | 10/1977 | Winzen |
| 4,158,483 A | 6/1979 | Fisher et al. |
| 4,196,461 A | 4/1980 | Geary |
| 4,221,576 A | 9/1980 | Phillips, Jr. |
| 4,394,146 A | 7/1983 | Klein |
| 4,405,342 A | 9/1983 | Bergman |
| 4,470,833 A | 9/1984 | Wolfe |
| 4,887,197 A | 12/1989 | Effinger |
| 4,905,326 A | 3/1990 | Nakamura |
| 5,098,767 A | 3/1992 | Linnersten |
| 5,217,513 A | 6/1993 | Armbruster |
| 5,271,106 A | 12/1993 | McClish et al. |
| 5,405,434 A | 4/1995 | Inculet |
| 5,560,835 A | 10/1996 | Williams |
| 5,576,901 A | 11/1996 | Hanchett |
| 5,846,135 A | 12/1998 | Hoskins et al. |
| 5,906,752 A | 5/1999 | Williams |
| 5,912,423 A | 6/1999 | Dought et al. |
| 5,934,796 A | 8/1999 | Quereau |
| 6,086,215 A | 7/2000 | Giattino et al. |
| 6,115,511 A | 9/2000 | Sakai et al. |
| 6,152,998 A | 11/2000 | Taylor |
| 6,168,646 B1 | 1/2001 | Craig et al. |
| 6,278,373 B1 | 8/2001 | Jauigue et al. |
| 6,292,171 B1 | 9/2001 | Fu et al. |
| 6,402,822 B1 | 6/2002 | Najm |
| 6,454,834 B1 | 9/2002 | Livingstone |
| 6,472,990 B2 | 10/2002 | Delmar |
| 6,491,735 B2 | 12/2002 | Najm |
| 6,561,658 B2 | 5/2003 | Mochizuki |
| 6,592,228 B1 | 7/2003 | Kawashima et al. |
| 6,596,059 B1 | 7/2003 | Geist et al. |
| 6,632,269 B1 | 10/2003 | Najm |
| 6,743,282 B2 | 6/2004 | Najm |
| 6,781,329 B2 | 8/2004 | Mueller et al. |
| 6,827,464 B2 | 12/2004 | Koren et al. |
| 6,843,834 B2 | 1/2005 | Schumacher |
| 6,857,746 B2 | 2/2005 | Dyner |
| 6,906,686 B2 | 6/2005 | Ishikawa |
| 6,936,978 B2 | 8/2005 | Morgan |
| 6,951,411 B1 | 10/2005 | Kumar et al. |
| 6,956,696 B2 | 10/2005 | Hachkowski et al. |
| 7,142,168 B1 | 11/2006 | Sinclair |
| 7,151,264 B2 | 12/2006 | Ehlers, Sr. |
| 7,161,311 B2 | 1/2007 | Mueller et al. |
| 7,186,290 B2 | 3/2007 | Sheehan et al. |
| 7,187,141 B2 | 3/2007 | Mueller et al. |
| 7,244,294 B2 | 7/2007 | Kates |
| 7,274,382 B2 | 9/2007 | Plut |
| 7,292,252 B2 | 11/2007 | SaMatsuda |
| 7,303,301 B2 | 12/2007 | Koren et al. |
| 7,357,525 B2 | 4/2008 | Doyle |
| 7,410,268 B2 | 8/2008 | Koren et al. |
| 7,413,319 B2 | 8/2008 | Longoria et al. |
| 7,471,432 B2 | 12/2008 | Pruyn |
| 7,482,764 B2 | 1/2009 | Morgan et al. |
| 7,524,069 B2 | 4/2009 | Murayama et al. |
| 7,534,057 B2 | 5/2009 | Jones et al. |
| 7,699,515 B2 | 4/2010 | Faber et al. |
| 7,712,913 B2 | 5/2010 | Gardenier et al. |
| 7,717,582 B2 | 5/2010 | Longoria et al. |
| 7,735,385 B2 | 6/2010 | Wilson et al. |
| 7,740,367 B2 | 6/2010 | Koren |
| 7,744,237 B2 | 6/2010 | Potucek et al. |
| 7,810,942 B2 | 10/2010 | Kunkel et al. |
| 7,862,179 B2 | 1/2011 | Shan et al. |
| 7,896,940 B2 | 3/2011 | Sundet et al. |
| 7,982,935 B2 | 7/2011 | Grapov et al. |
| 8,047,475 B2 | 11/2011 | Fukumoto et al. |
| 8,057,112 B2 | 11/2011 | Amadril et al. |
| 8,118,434 B2 | 2/2012 | Turner et al. |
| 8,179,586 B2 | 5/2012 | Shofield et al. |
| 8,313,567 B2 | 11/2012 | Sullivan |
| 8,801,191 B2 | 8/2014 | Nemeth et al. |
| 2003/0230061 A1 | 12/2003 | Kubokawa et al. |
| 2005/0035728 A1 | 2/2005 | Schanberger et al. |
| 2005/0047134 A1 | 3/2005 | Mueller et al. |
| 2005/0146777 A1 | 7/2005 | Russell |
| 2005/0150382 A1 | 7/2005 | Sheehan et al. |
| 2006/0070527 A1 | 4/2006 | Chapman et al. |
| 2006/0102006 A1 | 5/2006 | Powell |
| 2007/0035862 A1* | 2/2007 | Brouwer ............... B60R 1/074 |
| | | 359/841 |
| 2007/0229929 A1* | 10/2007 | Soreide et al. ............... 359/201 |
| 2007/0257181 A1 | 11/2007 | Dittmer et al. |
| 2008/0068493 A1 | 3/2008 | Hida et al. |
| 2008/0072763 A1 | 3/2008 | Hauville |
| 2009/0061761 A1 | 3/2009 | Yang et al. |
| 2009/0121657 A1 | 5/2009 | Erchak et al. |
| 2009/0174868 A1 | 7/2009 | Matsuda |
| 2010/0019686 A1 | 1/2010 | Gutierrez, Jr. |
| 2010/0031767 A1 | 2/2010 | Chenu |
| 2010/0057803 A1 | 3/2010 | Ellis et al. |
| 2010/0128122 A1 | 5/2010 | Wright et al. |
| 2010/0250449 A1 | 9/2010 | Doyle et al. |
| 2010/0302515 A1 | 12/2010 | Plut |
| 2010/0331857 A1 | 12/2010 | Doyle et al. |
| 2011/0061527 A1 | 3/2011 | Sullivan |
| 2011/0146440 A1 | 6/2011 | Feng |
| 2011/0163677 A1 | 7/2011 | Baret |
| 2011/0246509 A1 | 10/2011 | Migita et al. |
| 2011/0297655 A1 | 12/2011 | Ueda |
| 2012/0035469 A1 | 2/2012 | Whelan |
| 2012/0133911 A1 | 5/2012 | LaDuke |
| 2013/0215012 A1 | 8/2013 | Reddy et al. |
| 2013/0215394 A1 | 8/2013 | Reddy et al. |
| 2013/0308064 A1 | 11/2013 | LaDuke |
| 2014/0078409 A1 | 3/2014 | Wang |
| 2014/0210373 A1 | 7/2014 | Baret |

FOREIGN PATENT DOCUMENTS

| | | |
|---|---|---|
| DE | 19654844 | 7/1998 |
| DE | 102009059689 | 6/2011 |
| EP | 0838696 | 4/1998 |
| EP | 1376509 | 1/2004 |
| FR | 2863345 A1 | 9/2006 |
| JP | 6079194 | 3/1994 |
| JP | 6233945 | 8/1994 |
| JP | 6246120 | 9/1994 |
| JP | 7275626 | 10/1995 |
| JP | H09021245 | 1/1997 |
| JP | 11104416 | 4/1999 |
| JP | 2008216412 | 9/2008 |
| WO | 9705595 A1 | 2/1997 |
| WO | 9931560 A2 | 6/1999 |
| WO | 0204091 | 1/2002 |
| WO | 2009008710 A1 | 1/2009 |
| WO | 2009156602 A1 | 12/2009 |
| WO | 2010043956 A1 | 4/2010 |
| WO | 2012136907 A1 | 10/2012 |
| WO | 2014043135 A1 | 3/2014 |
| WO | 2014043139 A2 | 3/2014 |

OTHER PUBLICATIONS

"Pan-Tilt Unit-D46 Models", FLIR Systems, Inc., Boston, MA, 1 page. (http://www.flir.com/mcs/view/?id=53703) (Accessed Jul. 30, 2013).

"Model PTU-D46, Quick Configuration Guide", Directed Perception, Burlingame, CA, 6 pages. (http://www.dperception.com/pdf/

(56) References Cited

OTHER PUBLICATIONS products/PTU-D46/PTU-D46-Config.pdf) (Accessed Jul. 30, 2013).

John F. Aubin, et al., "A Low Profile Three Axis Gimbal Assembly for Radome Measurements", Antenna Measurement Techniques Association 24th Annual Meeting & Symposium, Cleveland, Ohio, Nov. 3-8, 2002, Session 15, paper # A02-064, 5 pages. (http://www.microwavevision.com/sites/www.microwavevision.com/files/files/ORBIT-FR-LowProfileThreeAxisGimbalAssembly-02-15-07-Aubin.pdf) (Accessed Jul. 30, 2013).

Nitish Swarup, Title: "Design and Control of Two-Axis Gimbal System for use in Active Vision", Massachusetts Institute of Technology, May 1993. Bachelor's Thesis, 44 pages. (http://dspace.mit.edu/bitstream/handle/1721.1/12444/29874210.pdf?sequence=1) (Accessed Jul. 30, 2013).

"New products and services from IDA Members: Accurate INOX waterproof"; International Laser Display Assoc., Oct. 2006, 9 pages. (http://laserist.org/newproducts.htm) (accessed Jul. 30, 2013).

H.C. Gijie, "Conversations with Spaces", Feb. 15, 2009 (http://hcgilijie,wordpress.com/tag/projection/), 13 pages. (Accessed Jul. 30, 2013).

International Search Report from corresponding International application No. PCT/US13/53084 mailed Dec. 6, 2013.

International Search Report and Written Opinion of the International Searching Authority issued in PCT/GB2013/050388, mailed May 17, 2013, 12 pages.

International Search Report issued in PCT/US2013/053315, mailed Jan. 3, 2014, 1 page.

* cited by examiner

MULTIDIMENSIONAL ROTARY MOTION APPARATUS MOVING A REFLECTIVE SURFACE AND METHOD OF OPERATING SAME

CROSS-REFERENCE TO RELATED APPLICATIONS

This application is a continuation-in-part of U.S. patent application Ser. No. 13/626,871 filed Sep. 25, 2012 and also claims the priority of U.S. provisional patent application 61/678,622, filed Aug. 1, 2012, which are both incorporated herein by reference.

BACKGROUND OF THE INVENTION

In applications having light projection, one technique to allow mechanical motion to direct the light in the x and y axis is to use two discrete mirrors with one mirror allowing for rotation of the image in the x axis which is further superimposed on another mirror allowing for further rotation in the y axis. An advantage of this system is simplicity—the two axes can be parked on a rotating shaft such as a motor or a galvanometer with a simple control mechanism to control the position of the mirrors. A principal problem with this type of control system is that the reflection occurs on two surfaces resulting in losses and inaccuracies from the mirror surfaces imperfections. These issues result in a reduction of image intensity and quality. The two mirror configuration also requires a larger size/footprint. The primary mirror may be small but the secondary mirror, which collects all the diverging light from the primary source will need to be larger.

In addition, various methods exist for tip and tilting, x and y translation, of a single reflective surface. Some of them are used in sensitive applications such as in the aviation, space and medical fields and are very accurate, sometimes down to the milliradian. They use forces such as magnetic, mechanical, piezo, and other means of locomotion to tilt a system that is held in either a gimbal or a ball joint. Such systems need complex and carefully manufactured electronics to close a feedback loop allowing for proper functioning of the system rendering and tilt systems with a single reflective surface has a limited range of motion despite the higher resolution and cost, further limiting their applicability to most general applications. Alternately, other existing techniques that have a single reflective surface and employ a mechanical system need articulated arms and carefully designed ball joints to function, similarly saddling them with higher manufacturing costs and requiring larger footprints for deployment.

Another technique of enabling a single reflective surface in more than one axis of rotation employs a primary rotation medium that is coupled to a secondary rotation medium which in turn rotates the mirror. These devices actually move the second motor and as a result need more space for operation, again increasing the footprint of the system. The addition of a moving second motor adds mass to the moving components and increases inertia. The inertia of the motor can prohibit a smaller, lower power first motor from being used or from a small first motor to move with higher acceleration and deceleration. This higher inertia also renders such systems more prone to errors due to the larger moving masses. Further because the mirror is far from the main axis of rotation, the mirror surface has to be larger, making it impractical for limited physical space applications. These factors contribute to making these systems less accurate and requiring more space in a footprint for deployment in any control system.

Thus, there exists a need for a device and a method that provides tip and tilt control on two axis, offers the ability for systems to calculate the relative or absolute position of the mount surface or element quickly and efficiently, provide for fixed motors which in turn lower motor torque and provide a lower inertia of moving components and be cost effective. The system also needs to provide the motion at high speed, have a small form factor/net volume, use smaller motors to save weight, reduce cost, reduce inertial interference, lower power consumption, and result in robust, compact, cost effective device with high accuracy for mechanical and electrical systems.

SUMMARY OF THE INVENTION

An aspect of the invention is to provide a compact, cost effective, higher resolution, more accurate, more repeatable rotary motion control suitable for use in a projection system, such as within the confines of an underwater projection system.

A further aspect of the invention is to provide a lighter, more compact rotary motion control system.

A still further aspect is to provide a rotary motion control system having less inertial interference and better acceleration/deceleration for guiding an element mounted on a mounting member.

The invention includes a method, an apparatus, and an article of manufacture.

The apparatus of the invention includes a motion control system having an at least one mounting element coupled to an at least one support member; a two-axis coupling having at least two input shafts coupled to an at least two drive mechanisms; an at least one channeled portion in a second of the at least two input shafts through which the at least one support member extends there through and is guided thereby and where the at least one support member is coupled to the first of the at least two input shafts via an at least one input coupling coupled to and driving the at least one support member; and an at least one control input controlling the position of the at least two input shafts.

The motion control system can also include an at least two indexing blades coupled to the at least two input shafts. The system further comprising an at least one sensor calculating a relative position of the at least two input shafts and translating said motion to a two-axis output, wherein an input from the at least two drive mechanisms moves at least one of the at least two input shafts which member coupled to the mounting element and the second of the at least two input shafts within the at least one channeled member coupled to the first of the at least two input shafts such that the movement is measured by the at least one sensor and a measured two-axis output is reported to a controller.

The at least one coupling can fit within a curved portion of the at least one channeled member having the channel therein, with the at least one support member passing through the curved portion and the channel and coupling to the at least one coupling.

The motion control system can also include an at least one mirror element coupled to the support member through the at least one mounting element. The at least one mirror element can be a flat mirror element. The at least one mounting element can also mount an at least one of a multifaceted mirror, a divergent mirror, or a spheroid mirrored shape as the mirror element. The at least one support member can be coupled through the at least one mounting element to a mirror and the at least one mounting element can be coupled to the at least one support member through at least one of an angled attachment point relative to the mounting member or an offset attachment point from a center of said mounting element.

The at least one support member can be coupled to the second of the at least two input shafts by a hinged joint with a pin member, whereby the sliding of the at least one support member within the channel and about the hinge translates to movement in a pitch and a yaw axis of the at least one support member.

The at least one of the at least one coupling, at least two input shafts, and at least one channel are fabricated at least in part of a low friction wear surface comprising a low friction material. The low friction material can be a high performance polymer. The low friction material can be a High Molecular Weight Polyethylene and Polyethylene Terephthalate. Wherein at least one of the at least one couplings, at least two input shafts, and at least one channel are fabricated from a metal or a composite material or high performance polymer impregnated with a composite material.

The drive mechanisms can be magnetically or electromechanically coupled to the at least two input shafts. The motion control system can further include a chassis, the chassis supporting the at least two drive mechanisms at an angle relative to one another. The angle can be substantially 90 degrees.

The method of the instant invention includes a method of controlling a motion control system controlling a mirror within an underwater projection system in a water feature, the system having an at least one drive mechanism, with at least two input shafts coupled to and driven by the at least one drive mechanism; a channel portion in a first of the least two input shafts. A support member can be coupled to the second of the at least two input shafts, wherein the support member passes through the channel portion from the second of the at least two input shafts and extends to support a mirror mount where the at least one drive mechanism moves the at least two input shafts and this movement is imparted in the support member and the mirror bracket mounted thereon which in turn supports a mirror in the underwater projection system and guides an image from the underwater projection system within the water feature.

The method of the instant invention includes a method of controlling motion in a mirror element in an underwater image projection system, comprising providing a torque input from an at least one drive mechanism on command from a controller, turning a first of an at least two input shafts with said torque input, turning a second of an at least two input shafts with said torque input, same with said controller, engaging an at least one support member supporting said mirror element through the second of the at least two input shafts such that it slidingly engages with a channel in a second of the at least two input shafts, and moving the mirror through said engagement in a controlled fashion based on commands from said controller to steer with said mirror an image in an X axis and a Y axis relative to said water feature from said underwater image projection system based on the measured relative degree of turning in each of the at least two inputs.

The method can further include providing calibration of the system from a calibration module, the calibration module receiving input corrections provided during or after operations and translates the input corrections to relative X axis and Y axis movement and compensates for these corrections in the measured relative degree of turning in the at least two input shafts when providing the X axis and Y axis outputs. The method of claim can also include providing feedback from a feedback module, wherein the feedback module provides position feedback for a first axis of motion and second axis of motion relative to the at least one drive mechanism.

Moreover, the above objects and advantages of the invention are illustrative, and not exhaustive, of those which can be achieved by the invention. Thus, these and other objects and advantages of the invention will be apparent from the description herein, both as embodied herein and as modified in view of any variations which will be apparent to those skilled in the art.

BRIEF DESCRIPTION OF THE DRAWINGS

Embodiments of the invention are explained in greater detail by way of the drawings, where the same reference numerals refer to the same features.

DETAILED DESCRIPTION OF THE INVENTION

Figure 1:
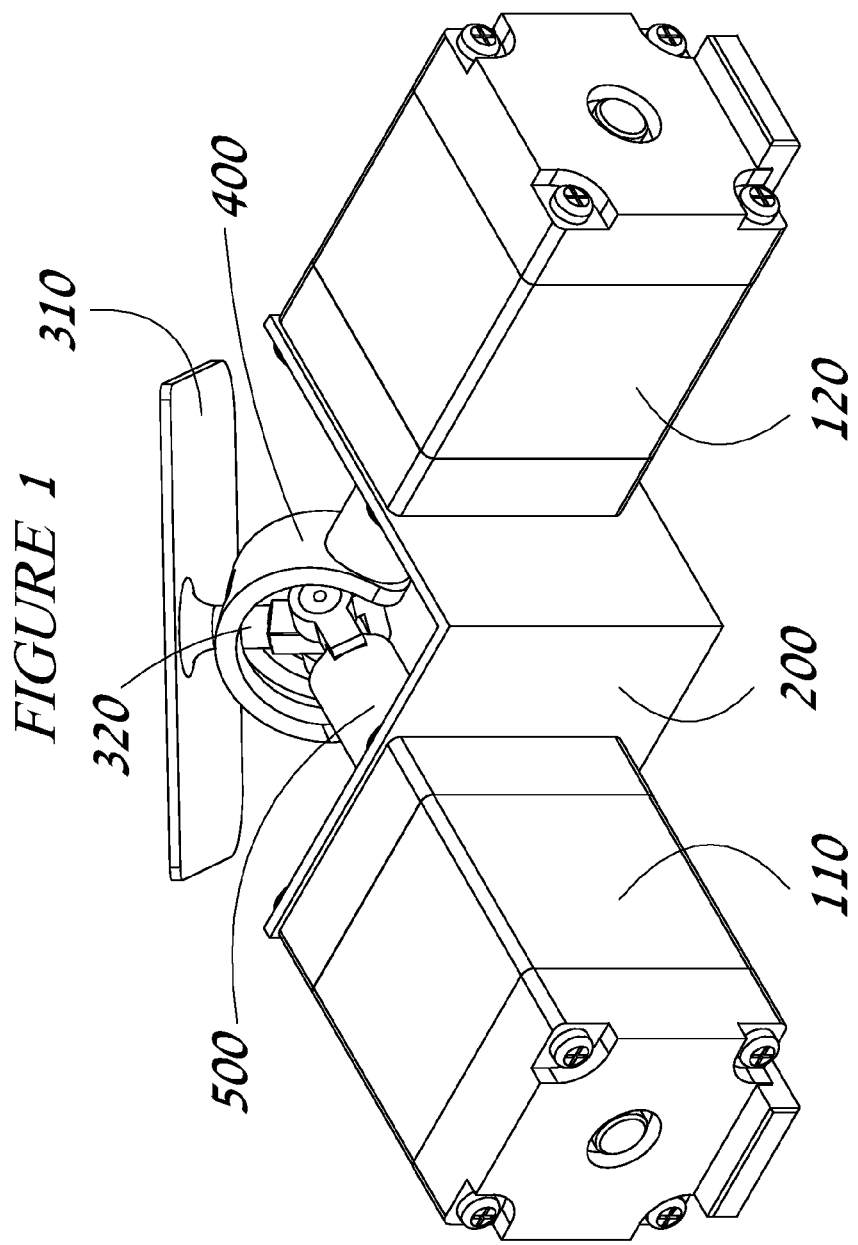
FIG. 1 shows an isometric view of the rotary motion system and driver.
Figure 2:
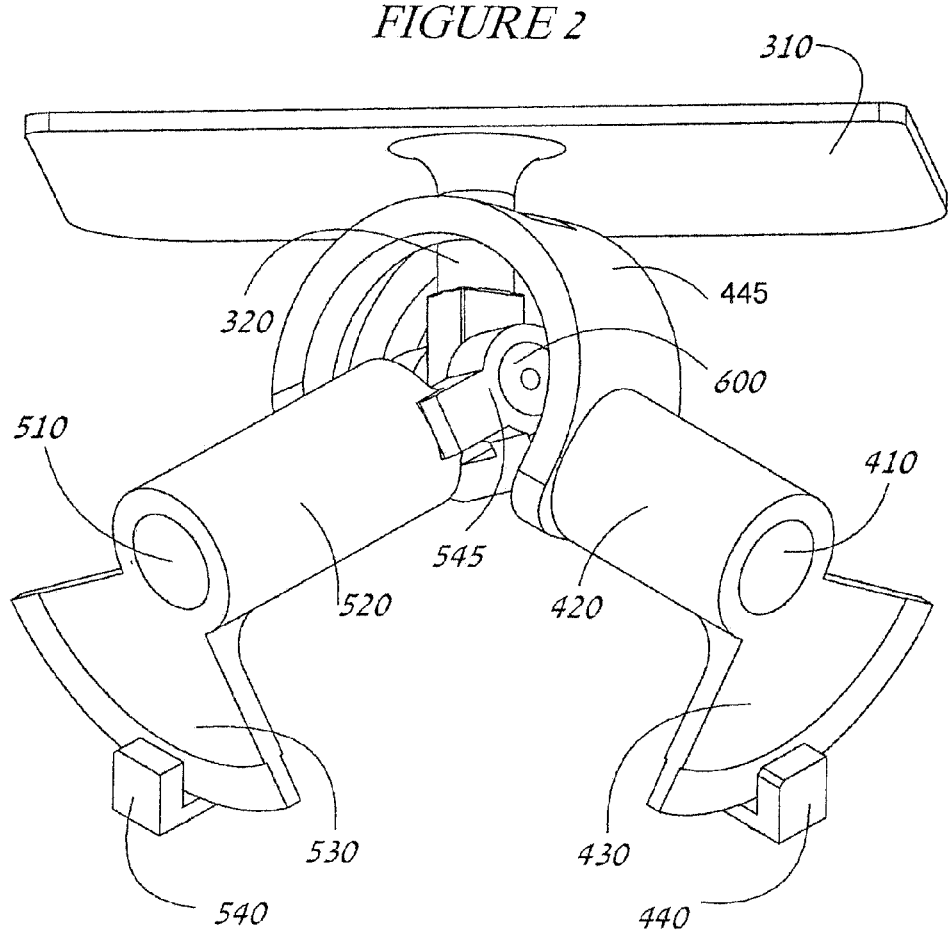
FIG. 2 shows a further isometric view of the rotary motion control system and drive of FIG. 1.

FIG. 1 shows an isometric view of the rotary motion control system and driver. The system includes a mounting element 310 coupled to and output or support shaft 320 through a two-axis coupling generally shown as 400, 500 having at least two input shafts 420, 520 which are in turn coupled to at least two drive mechanisms 110, 120, respectively. In this exemplary embodiment shown, the at least two drive mechanisms 110, 120 are shown as electromagnetic drive mechanisms 110, 120. These can be mechanically, magnetically or electromechanically coupled to the at least two input shafts 420, 520 as best shown in FIG. 2. The two electromagnetic drive mechanisms 110, 120 are coupled to a chassis 200. The chassis serves to hold the motors stationary at a required position and angle. The angle in the embodiment is 90 degrees but other angles could also be employed without departing from the spirit of the invention. In FIG. 1, drive mechanisms 110 and 120 represent an electric motor. Some non-limiting examples of further mechanical driving systems include but are certainly not limited to galvanometers, stepper motors, motors with gears or tranmissions, and the like. Modifications can be made to the driving source without departing from the spirit of the invention.

FIG. 2 shows a further isometric view of the rotator motion control system and drive of FIG. 1. In this figure, the drive mechanisms 110, 120 have been omitted to more clearly see the workings of the embodiment. FIG. 2 provides a clearer view of the two-axis coupling members 400, 500. As shown in FIG. 2, at least two indexing blades 430, 530 are provided to index the at least two input shafts 420, 520, here shown as a first input shaft 520 and a second input shaft 420, which are driven from drive shafts 410, 510 coupled to the input shafts 420, 520 and drive members. The drive members may be electrical motors, magnetic drives, piezo drives, mechanical drives, or similar devices, as noted above.

The drive mechanisms 110, 120 move drive shafts 410 and 510 which impart movement in the input shafts 420, 520 respectively. The, drive shafts 410, 510 allow rotary torque from drive mechanisms 110, 120 to be transmitted to the coupling members 400, 500. The coupling is created in this exemplary embodiment through keying the drive shafts 410, 510 within the input shafts 420, 520. In further exemplary embodiments the drive and input shafts may be a single component. These points of coupling in the exemplary embodiment of FIG. 2 are keyed to prevent slippage with between the drive shaft 410, 510 and input shaft 420, 520. The coupling of the drive shafts 410, 510 may allow for a screw or other fastening device to be used that allows for parts to be connected to them. Each blade is coupled to the controller through optical sensors 440, 540 which, in conjunction with a controller 700 index the position of the at least two indexing blades 430, 530 and thereby the position of the input shafts 420, 520.

In the exemplary embodiment shown, the sensors are, as a non-limiting example, opto-interrupter type sensors. In further exemplary embodiments, other sensors can be used, for instance but certainly not limited to, Hall Effect sensors, potentiometers, capacitive sensors, and the like. The sensor type shown in the exemplary embodiment allows for the edges of the indexing blades 430, 530 to be detected which in turn allows for detection of an absolute position for the arms. Alternately, in one of the further exemplary embodiments for instance, one can use Hall Effect sensors, capacitive sensors or potentiometers to provide a linear or multipoint signal to identify the position directly. In further exemplary embodiments, one can couple the sensors to a different part of the drive mechanism, such as the other side of the motor, or to any part of the gearbox, that can allow a controller to track the relative motion and relate this to the pitch and yaw translation of the reflected image or radiation without departing from the spirit of the invention.

The first coupling member 500 is linked to an at least one support shaft 320 and the second input shaft 520 guides the support shaft 320 in an at least one channel member 445 to facilitate controlled motion of the mounting element 310. The motion of input shafts 420, 520 are transferred through the linkage 545 or the channel member 445 which in turn propel and guide the at least one support shaft 320. The at least one support shaft 320 passes through the channel 450 and is coupled to the coupling member 500 by an at least one input coupling or linkage 545 which is coupled to and drives the at least one support shaft 320. Although a single support shaft 320, a single channeled member 445, and a single drive or input coupling 545 are provided, additional elements or members may be utilized without departing from the spirit of the invention. In the exemplary embodiment shown, the at least one input coupling 545 fits within a curved portion of the at least one channeled member 445, the at least one support drive or input coupling 545. The at least one support shaft 320 supports an at least one mount element or base 310. The exemplary embodiment shows a mirror coupled to the at least one mount element or base 310 and the mount element or base 310 being directly secured to the driven support shaft 320. However, several different techniques to attach the at least one mount element or base 310 to the support shaft 320, for instance variations can be provided to aid in the manufacturability and durability of the product. Some non-limiting examples of alternate mechanisms for coupling the driven shaft can include designing the mirror to be inserted into a socket or cavity to ensure accurate positioning of the mirror without departing from the spirit of the invention. The surface that is moved by the driven shaft may also be secured to the shaft using a screw or other fastening mechanism or similar mechanisms. The exemplary embodiment shown uses a flat mirror, however, several different shapes of mirrors and optics are contemplated, as further seen in FIGS. 7 A through 7D and described herein below.

The at least two drive mechanisms 110, 120 input motion through an at least two drive shafts or couplings 410, 510 which in turn move the at least two input shafts 420, 520 respectively. The at least two input shafts 420, 520 turn and input or indexing blades 430, 530 measures the degree of this movement and with the controller 700 control this movement. The at least two input shafts 420, 520 are coupled to one another and the at least one support shaft 320 through input coupling 545 which extends from input shaft 520 and is coupled through the input coupling 545 to the support shaft or member 320 and the channel 450 in input shaft 420 through which the support shaft 320 passes. In this fashion the rotation of the drive shafts 410, 510 is translated into motion of the respective at least two input shafts 420, 520. This motion in turn moves input shaft 520 and support shaft or member 320 about the axis of pin 600 which guides support member or shaft 320 within the channel 450. By sliding within channel 450 and about the hinge created by pin 600 the pitch and yaw of support shaft 320 is achieved.

The sliding and motion of the two axis coupling can be further aided by adding lubrication to the moving parts and the channel. The lubricant may be of any typical type, including but not limited to an oil, silicone, mineral, or similar lubricant which can be applied or contained in a bath to adhere to the moving parts of the coupling members 400, 500 of the two axis coupling to allow for free and smooth low friction motion. Additionally, the fabrication of members 300, 400, and 500 may include low friction wear surfaces which come in contact with other moving members using low friction materials such as a high performance polymer, such as but certainly not limited to Polyoxymethylene (POM), Polyetheretherketone (PEEK), Polyimide (PI), Polyamide (PA), Ultra High Molecular Weight Polyethylene (UHMWPE) or Polyethylene Terephthalate (PET) as non-limiting examples. These materials can be used to fabricate the entirety of the component or the wear surfaces. The components in the exemplary embodiment are as a nonlimiting example fabricated completely from POM. Additional embodiments can utilize a metal, such as but certainly not limited to anodized aluminum, stainless steel, or a composite material such as a reinforced graphite or high performance polymer impregnated with a composite material, or similar compounds in the fabrication of the device to minimize wear and friction.

Figure 3:
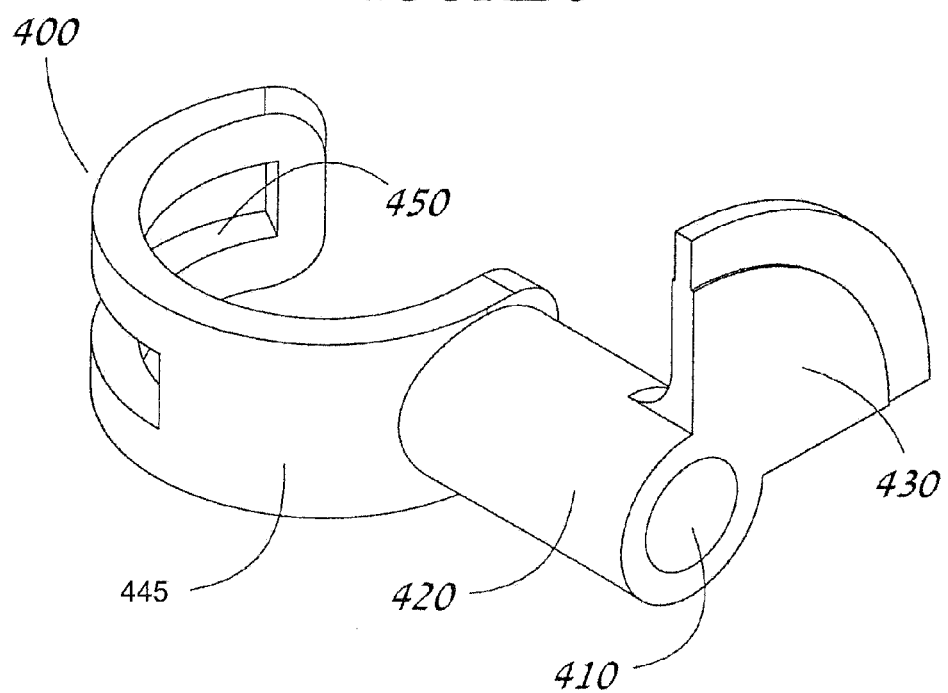
FIG. 3 shows an isometric view of the second drive shaft of the exemplary embodiment of FIG. 2

FIG. 3 shows an isometric view of the second input shaft of the exemplary embodiment of FIG. 2. As shown in the figure, an indexing blade 430 is shown with an input shaft 420 coupled thereto. A curved section 441 of the channeled member 445 is provided and the channel 450 in the channel member 445 is shown therein. The channel 450 is created so that the at least one support shaft or member 320 can glide through it when propelled by the second input shaft 420. However it is the second indexing blade 430 that controls the position of the at least one mount element 310 in the secondary axis.

Figure 4:
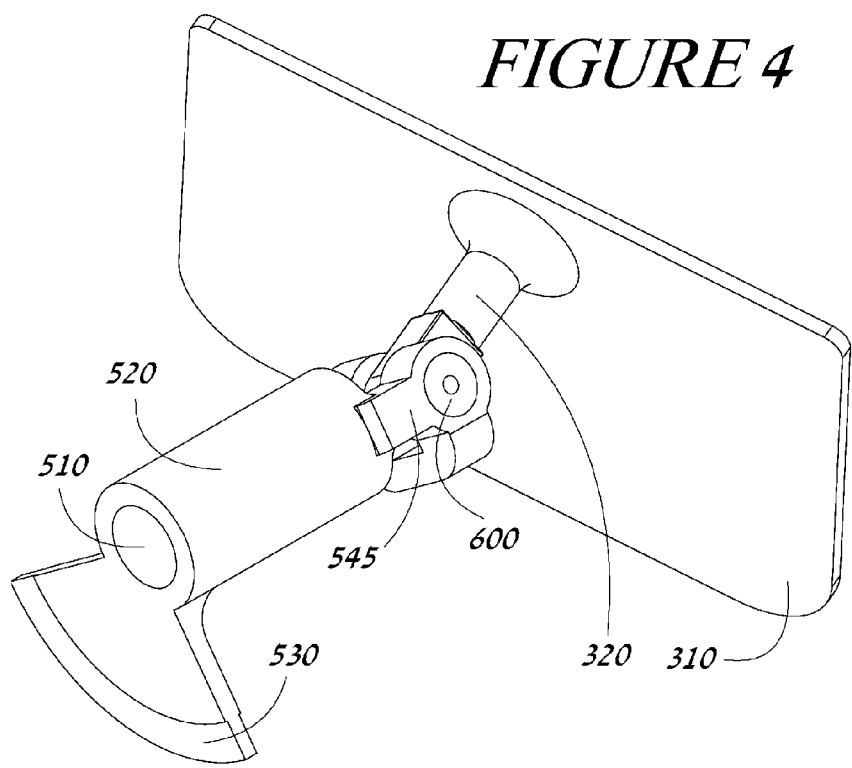
FIG. 4 shows an isometric view of the first drive shaft coupled to the support shaft of FIG. 2.

FIG. 4 shows an isometric view of the first input shaft coupled to the mirror support of FIG. 2. As shown first support shaft 520 is coupled to the mirror support 320 through input coupling 545. A central drive shaft 510 is located within the first support shaft 520. As shown, this is a joint coupling with a pin member 600, the joint coupling permitting two-axis motion of the mirror base 310 through the mirror support 320, as better descried in FIG. 5. The second support member 420 restrains and guides the motion imparted by the first support member 520 allows for pan-yaw motion of the at least one mirror base 310. The pin 600 may also be but is certainly not limited to a screw, a rivet, a standoff bolt or the like. The design of the hinge member or input coupling 545 may allow a screw to secure drive shaft 510 to input shaft 520, permitting only one axis of motion. Various approaches may be used to serve the function of pin 600 without departing from the spirit of the invention.

Figure 5:
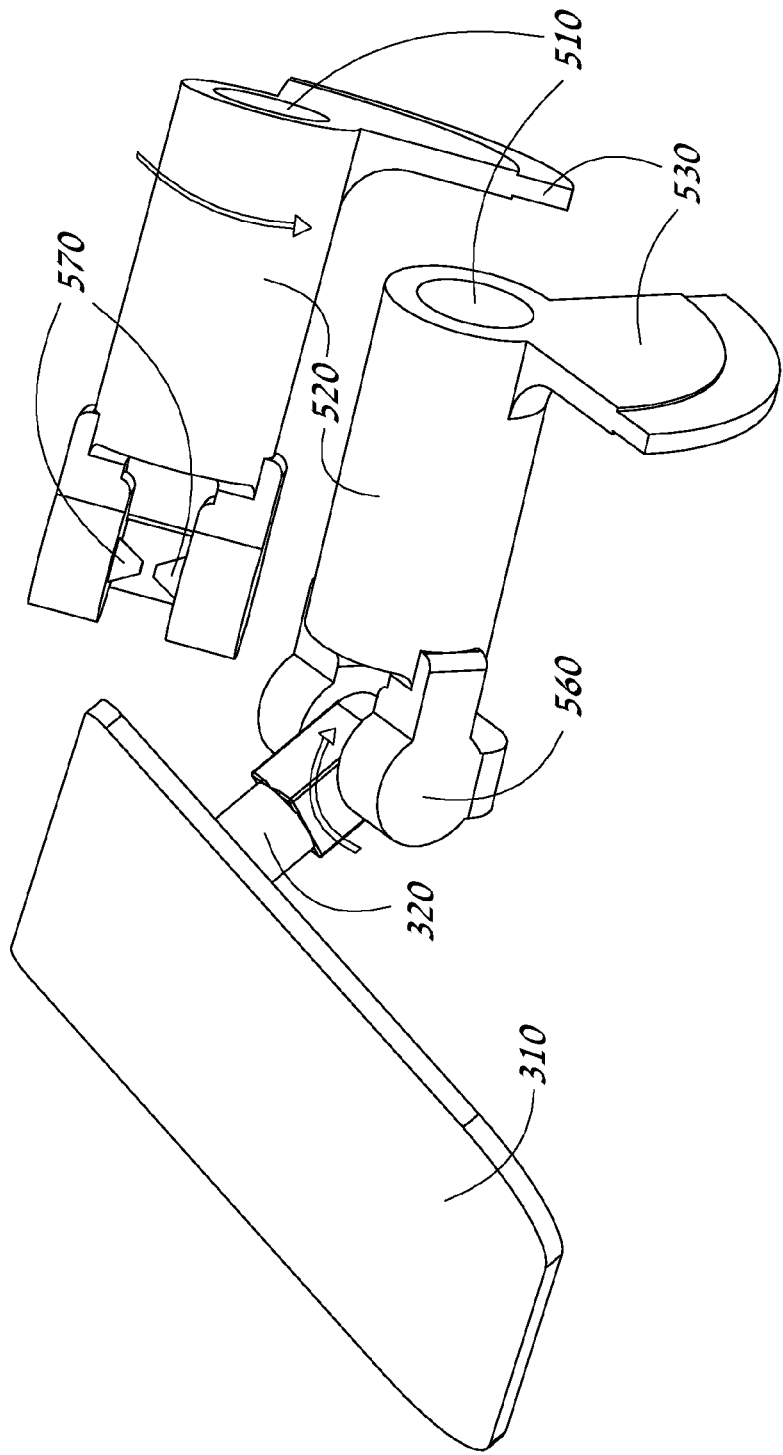
FIG. 5 provides a further isometric view of the first drive shaft coupled to the mirror support of FIG. 4 with relative motion indicated.

FIG. 5 provides a further isometric view of the first input shaft coupled to the mirror support of FIG. 4 with relative motion indicated. FIG. 5 highlights the two axis of motion available to the first input shaft 520. A driven motion turns the input shaft 520, as shown by the arrow, in a direction based on motion imparted on the index blade 530. This can be imparted electromagnetically, as would be provided by a galvanometer or electromagnetic motor or the like, or through mechanical means, such as but not limited to a stepper motor or worm gear motor or the like. The relative motion of the blade 530 is translated very accurately to motion in the input shaft 520. The input shaft in turn turns as indicated. In addition, through the pinned joint of input coupling 545, mirror support shaft 320 is free to pivot about the pin 600 in the input coupling 545. This axis of motion is restrained by the channel 450 of the first input shaft and its channel member 445. As noted above, in this fashion the motion of the mirror support 310 is accomplished and controlled.

Figure 6:
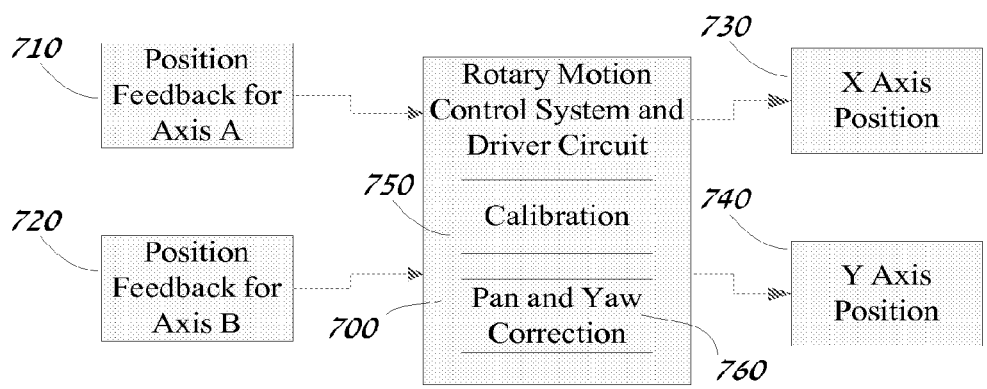
FIG. 6 shows a plan view for a controller for the exemplary embodiment of FIG. 1.

FIG. 6 shows a plan view for a controller for the exemplary embodiment of FIG. 1. The controller 700 is coupled to or contains a Rotary Motion Control System and Driver Circuit. It provides a module for calibration 750 of the system and a separate module for pan and yaw correction 760, as shown. The circuit includes sensors 440, in this case opto-isolator sensors as discussed further herein below, 440, 540 as seen in FIG. 2 in the system providing position feedback for the first axis of motion (Axis A) and second axis of motion (Axis B) relative to the at least two drive mechanism alone or in conjunction with the indexing blades. Relative positions of the at least to indexing blades 430, 530 are related to the position of the system in the calibration module. The pan and yaw correction module takes programmed corrections provided during or after operations and translates this to relative X axis and Y axis outputs 730, 740 respectively.

One non-limiting example of an application of the exemplary embodiment of the instant invention as shown and described herein is as the rotary motion control system and driver circuit as a component of an underwater projection system secondary steering mechanism used in conjunction with an underwater DLP projection system. The second mirror functions to move reflected images from the underwater DLP projection system within a defined boundary space within a water feature such as, but not limited, to a pool as described in Applicant's co-pending U.S. patent application Ser. No. 13/533,966, filed Jun. 26, 2012. The controller 700 may be a controller for such an underwater projection system or a further controller or a separate controller communicating with the controller 700 and the modules discussed above.

Figure 7A:
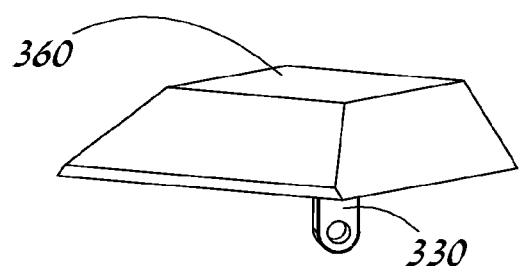
FIGS. 7A-7D show various shapes and configurations of mirrors and optics that may also be used in conjunction with the exemplary embodiments of the invention.
Figure 7B:
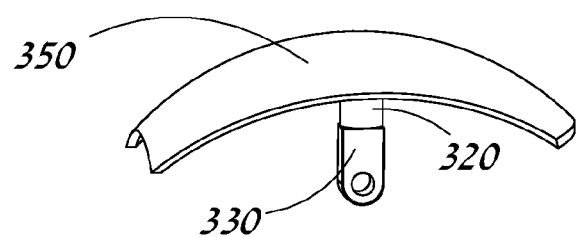
Figure 7C:
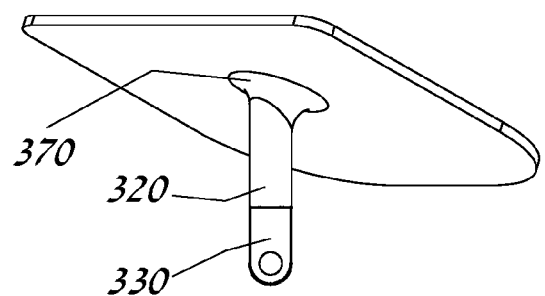
Figure 7D:
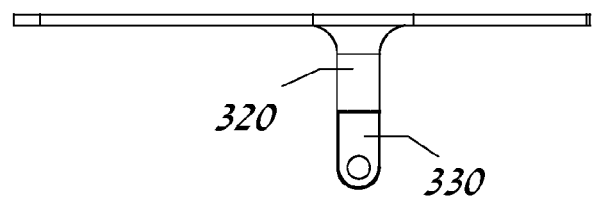

FIGS. 7A-7D show various shapes of mirror elements that may alternatively be used in conjunction with the exemplary embodiment of FIG. 1. In addition to the flat mirror base 310 shown in FIGS. 1-6, FIGS. 7A-7D show various shapes and configurations of mirrors and optics that may also be used in conjunction with the exemplary embodiment. These embodiments are non-limiting examples and are provided to show the breadth of the utility of the invention as a beam steering device. FIG. 7a represents a multifaceted mirror or optic 360, having several reflective planes and coupled to a shortened mirror support 320 and coupling 330 that receives the pin 600 as identified above. FIG. 7B shows a divergent mirror 350 with a generally convex shape similar to a surface portion of a sphere coupled to the mirror support 320 and the coupling 330. FIG. 7C shows a flat mirror element 310 with an angled attachment point 770 at the attachment point of the mirror support 320 and coupling 330. FIG. 7D shows an offset attachment point for a flat mirror base 310 with mirror support 320 not attaching at the center of the mirror base 310 but at an offset point and having the mirror support 320 extend from there to the coupling 330. In addition, the support shaft 320 and mount element 310 can attach other elements such as optics, optical modulations, diffraction gratings, reflective surfaces and the like.

Figure 8A:
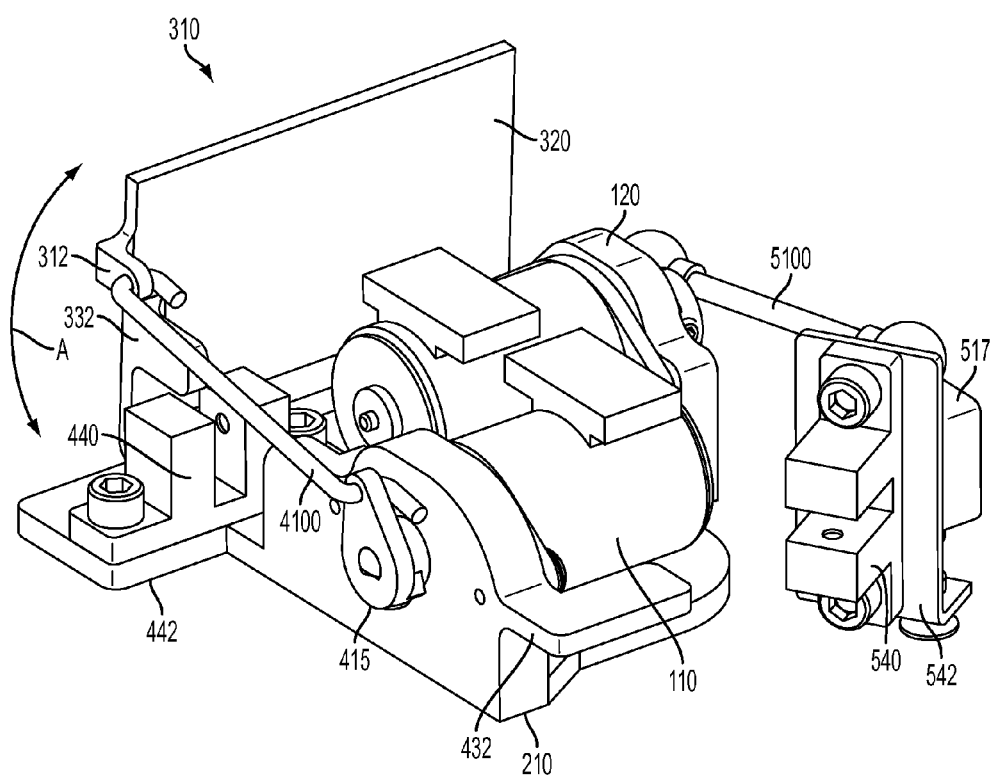
FIGS. 8A-8C show isometric left, right, and bottom views of a further exemplary embodiment of the rotary motion control system.
Figure 8B:
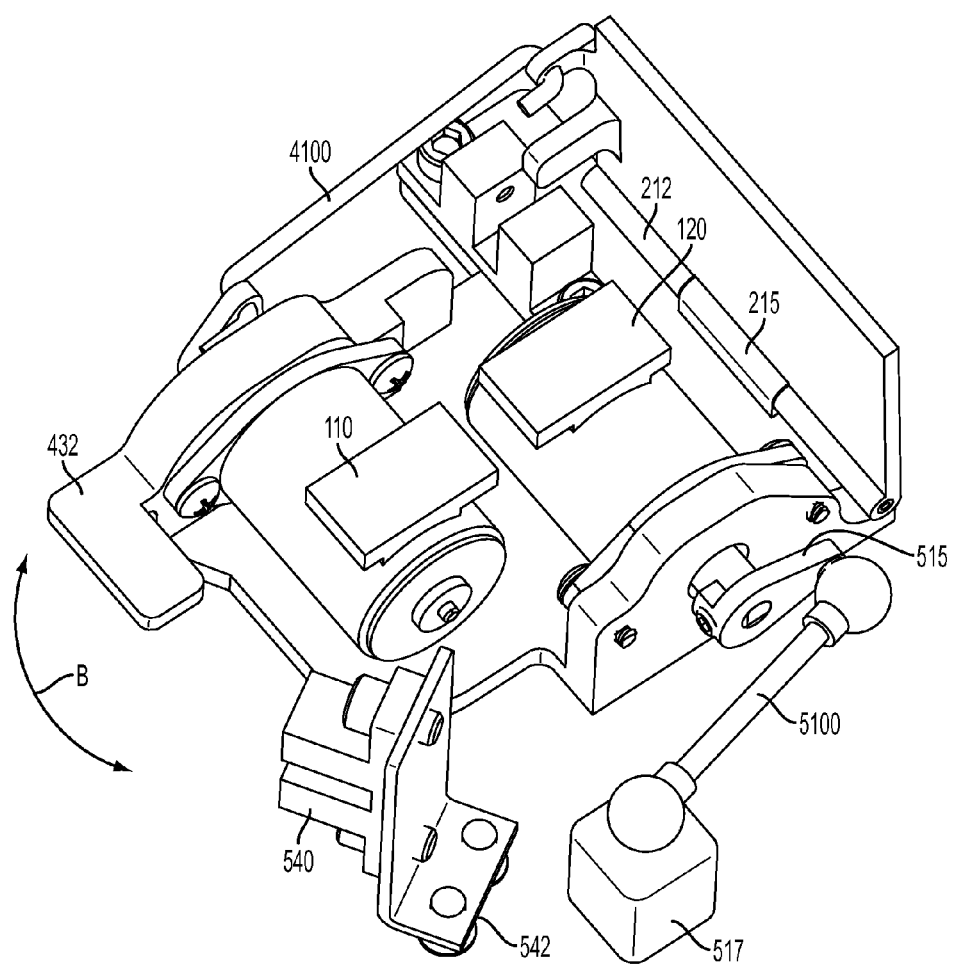
Figure 8C:
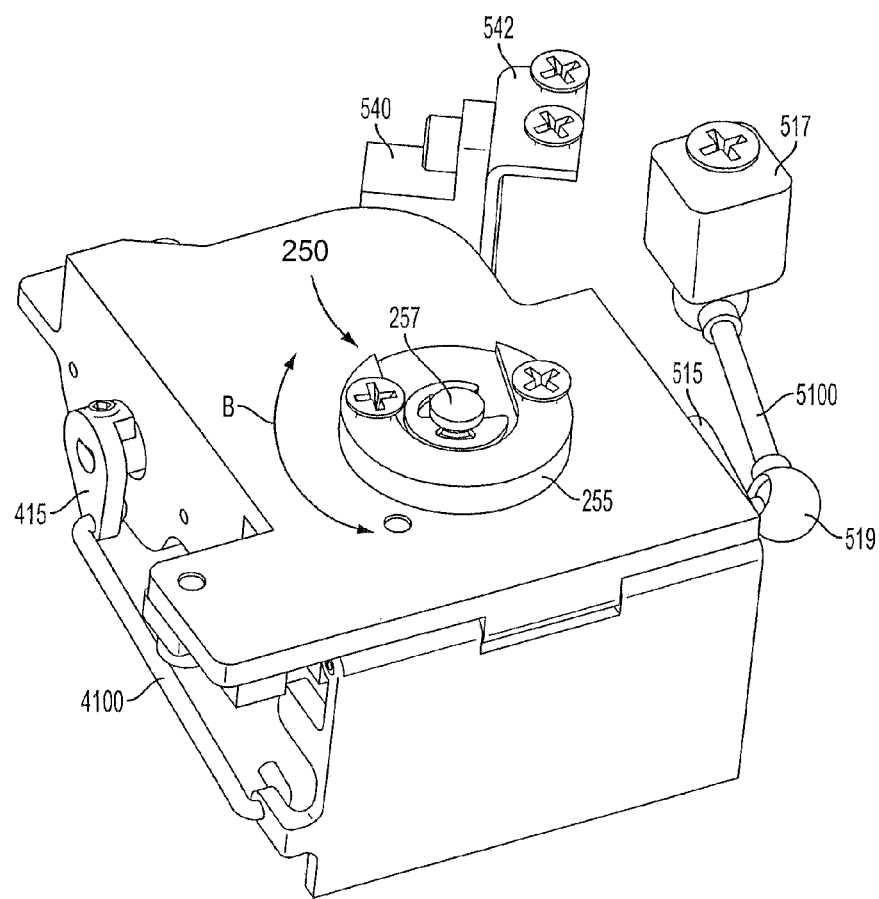

FIGS. 8A-8C show isometric left, isometric right, and isometric bottom views of a further exemplary embodiment of the rotary motion control system. The system moves a mirror member 310 on a mirror support 320. A chassis or body member 200 has an at least one motor, shown as a first motor 110 for imparting vertical or up-down motions in the mirror element 310 and a second motor 120 imparting horizontal or side to side motion as described herein below.

Figure 9:
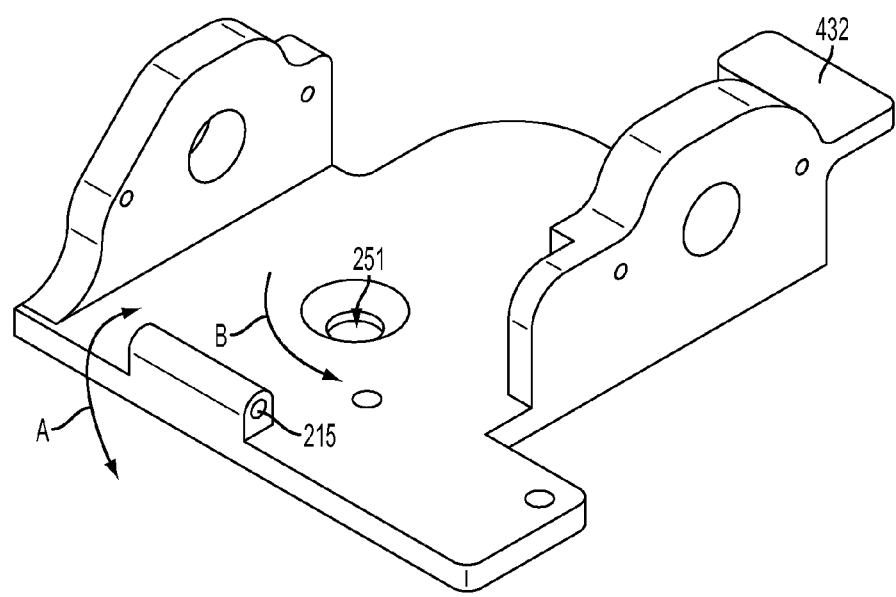
FIG. 9 shows an isometric view of the chassis of the exemplary embodiment of FIGS. 8A-C

As see in FIG. 8A an at least one vertical cam 415 is coupled to the first or vertical drive moor 110. The cam 415 is coupled to a attachment point 312 that extends from the mirror support 320. The attachment point 312 is connected to the vertical cam 415 through a first of an at least two drive shafts or linkages, here vertical linkage 4100. A similar second of an at least two drive shafts or linkages is shown in FIGS. 8A-9 as horizontal linkage 5100. Additional shafts, input shafts, or linkages may be used to couple the respective at least one cams to the mirror element and impart relative motion. The vertical linkage is also in communication with an at least one sensor, here shown as vertical sensor 440 mounted on a sensor support 442. The sensor 440 determines the condition of the movement imparted to the mirror element 310 by the linkage 4100. In this instance the at least one sensor also includes a horizontal movement sensor 540 and a bracket or support member 542 in communication with the horizontal linkage. The horizontal movement as described herein below in relation to FIGS. 8B-10B is also thereby tracked.

The motion produced by the at least one vertical cam 415 through the linkage 4100 provides a moment of movement about a hinge 215 and hinge pin 212, as better seen in relation to FIGS. 8B and 9. The movement is about the axis of the hinge pin 212 and is shown in the figure with the aid of arrows as relative motion A. The hinge 215 acts as a first restraint mechanism permitting the motion indicated.

FIG. 8B shows an isometric view from the side of the device opposite that of 8A. The hinge 215 and hinge pin 212 are more clearly seen in relation to the mirror support 320. The at least one motor, here vertical motor 110 and horizontal motor 120, are also shown. A fixed mount 517 exists apart from the chassis 210. The mount secures a ball and socket joint acting as a coupling to the second of an at least two drive shafts or linkages, here the horizontal linkage 5100. The horizontal linkage 5100 is coupled by a further ball and socket coupling mechanism at an opposite end of the horizontal linkage 5100 to a further at least one cam, here horizontal cam 515. The horizontal cam 515 is coupled to the drive motor 120 and acts to move the chassis 210 about the ends of the horizontal linkage 5100. As noted above, a horizontal sensor 540 and support member or bracket 542 engage a sensor element 432 to determine horizontal movement.

The motion of the horizontal cam 515 moves the coupling with the at least one horizontal linkage 5100. The other end of the linkage being fixed to the fixed mount 517, the motion is restrained and the relative distance between the coupling points fixed. The circular motion of the horizontal cam results in a twisting moment about the chassis 210 relative to FIG. 8B shown in the figures by movement arrow B. This twisting moment is the horizontal movement as the device is on a pivot point 257, the fixed coupling acting as a second further restraining mechanism resulting in motion about the pivot, as further shown and described in relation to FIG. 8C.

FIG. 8C shows a bottom view of the exemplary embodiment of FIGS. 8A-8B. A pivot member 250 is provided passing through an element of the chassis as best seen in FIG. 9. The pivot member 250 includes a pivot member support body 255 and the pivot member support body 255 has or acts as or on a low friction spacer. The pivot member 250 further includes a pivot pin 257 that allows for movement as indicated by movement arrow B, about the axis of the pivot pin 257. This is imparted by the translation of the horizontal cam 515 imparting motion through the couplings to the horizontal linkage 5100. As noted previously a sensor 540 and bracket 542 are provided to sense the horizontal position of the device.

FIG. 9 shows a further isometric view of the chassis of the exemplary embodiment of FIGS. 8A-8B. As more clearly seen in this view the hinge 215 and pivot pin member hole 251 are clearly seen. It is about the axis of these two elements the chassis is moved to import both pitch and yaw or vertical and horizontal motion in the mirror element 310. In the case of the up-down or vertical motion provided by the vertical linkage 4100, the hinge 215 and hinge pin or member 212 restrain the devices relative motion. Further, the inset nature of the pivot member prevents unbridled movement and limits the motion imparted to rotation about an axis, namely the axis of the pivot pin. As best shown by the arrows showing relative motion.

Figure 10A:
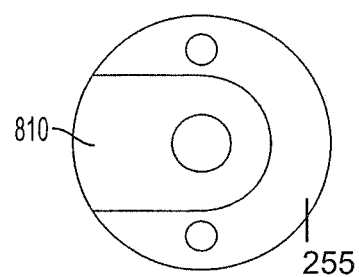
FIGS. 10A and 10B show the pivot member of the exemplary embodiment of FIGS. 8A-C with the support member.
Figure 10B:
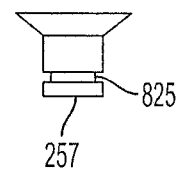

FIGS. 10A and 10B show the pivot member 250 of the exemplary embodiment of FIGS. 8A-C with the pivot member support body 255. The pivot member 250 includes the pivot pin 257. The pivot pin 257 is oriented such that the chassis 210 rests atop of it. It is held by the pivot member support body 255. The pivot member support body 255 passes through the pivot member hole 251. The pivot pin 257 is in contact with the pivot member support body 255.

The pivot member support body 255 is provided with a slot 810 which corresponds to a groove 825 on the pivot pin 257. The pivot pin 257 is slidingly coupled to the pivot member support body 255. This is one example of providing the pivot pin 257, further variations in the exact members may be provided such that a pivot pin 257 supports the chassis 210 and allows for the movement indicated.

Thus through the at least one cam, here horizontal and vertical cams, coupled to the mirror support member 320 through an at least two linkages and restrained by a hinge member and a pivot member, the mirror element 310 is provided both vertical or up down movement as well as horizontal or side to side movement in the further embodiment.

The embodiments and examples discussed herein are non-limiting examples. The invention is described in detail with respect to preferred embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

What is claimed is:

1. A motion control system controlling a mirror element within an underwater projection system in a water feature, pool, or spa, the system comprising:
   a first drive mechanism and a second drive mechanism;
   a first cam mechanism driven by the first drive mechanism and a second cam mechanism driven by the second drive mechanism;
   a first input shaft coupled to and driven by the first cam mechanism and a second input shaft coupled to and driven by the second cam mechanism; and
   a mirror support member having a mirror element thereon coupled to the first input shaft, the mirror support member restrained by a first restraint mechanism so as to move about a moment in a first direction by the first input shaft, the mirror support member also restrained by a second restraint mechanism through the first restraint mechanism, so as to move the mirror support member about a moment in a second direction by the second input shaft acting on the second restraint mechanism through the second cam mechanism and the second drive mechanism, and this movement is imparted in the mirror support member and the mirror element mounted thereon which in turn guides an image from the underwater projection system within the water feature, pool or spa.

2. The system of claim 1, wherein the first restraint mechanism is a hinge and the first input shaft rotates the mirror support member about a hinge pin.

3. The system of claim 2, wherein the second restraint mechanism is a pivot and the second input shaft rotates the mirror support member about a pivot point.

4. The system of claim 3, wherein the first restraint mechanism or the second restraint mechanism results in vertical movement of the mirror element relative to the water feature, pool or spa.

5. The system of claim 4, wherein the first restraint mechanism or the second restraining restraint mechanism results in horizontal movement of the mirror element relative to the water feature, pool or spa.

6. The system of claim 3, wherein the first restraint mechanism or the second restraint mechanism results in vertical movement of the image by the mirror element relative to the water feature, fountain, pool or spa.

7. The system of claim 3, wherein the first restraint mechanism or the second restraint mechanism results in horizontal movement of the mirror element relative to the water feature, fountain, pool or spa.

8. The system of claim 1, further comprising a control input controlling a position of the first and second input shafts and a first sensor and a second sensor tracking a position of the mirror element via relative positions of the first and second input shafts.

9. The system of claim 1, further comprising a low friction spacer and a chassis, wherein the chassis supports the first and second drive mechanisms and the spacer supports the chassis at the second restraining mechanism and eases the movement of the mirror support member about a moment in either the first or second directions.

10. The system of claim 9, wherein the first and second sensors further comprise optical interruption sensors.

11. A motion control system controlling a mirror element within an underwater projection system in a water feature, pool, or spa, the system comprising:
a base;
a first drive mechanism coupled to the base;
a second drive mechanism coupled to the base;
a first linkage coupled to and driven by the first drive mechanism;
a second linkage coupled to and driven by the second drive mechanism; and
a mirror support member having a mirror element thereon coupled to the first linkage and the base, wherein the mirror support member is coupled to the base by a first restraint mechanism, which limits the motion imparted on the mirror support member by the first linkage to a first plane, and wherein the second linkage acts upon the second drive mechanism to rotate the base and the mirror support member about a second restraint mechanism in a second plane.

12. The system of claim 11, wherein the first restraint mechanism is a hinge and the mirror support member rotates about a hinge pin.

13. The system of claim 12, wherein the second restraint mechanism is a pivot pin and the base and the mirror support member rotates about an axis of the pivot pin.

14. The system of claim 13, further comprising a low friction spacer positioned between the base and the pivot pin configured to allow the base to rotate in relation to the pivot pin upon actuation of the second drive mechanism.

15. The system of claim 11, further comprising an at least one control input controlling a position of the first linkage and the second linkage and tracking a position of the mirror element via relative positions of the first linkage with a first sensor and the base with a second sensor.

16. The system of claim 15, wherein the first sensor and the second sensor are optical interruption sensors.

17. The system of claim 11, wherein the first restraint mechanism or the second restraint mechanism results in vertical movement of an image by the mirror element relative to the water feature, fountain, pool or spa.

18. The system of claim 11, wherein the first restraint mechanism or the second restraint mechanism results in horizontal movement of the mirror element relative to the water feature, fountain, pool or spa.

19. The system of claim 11, wherein the first plane and the second plane are orthogonal to each other.

* * * * *